(12) United States Patent
Hines

(10) Patent No.: US 12,246,434 B2
(45) Date of Patent: Mar. 11, 2025

(54) METHOD FOR OPERATION AND MONITORING OF PAINTING ROBOT

(71) Applicant: FANUC AMERICA CORPORATION, Rochester Hills, MI (US)

(72) Inventor: Christopher Hines, Ann Arbor, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 284 days.

(21) Appl. No.: 17/664,261

(22) Filed: May 20, 2022

(65) Prior Publication Data

US 2023/0373099 A1 Nov. 23, 2023

(51) Int. Cl.
*B25J 13/00* (2006.01)
*B25J 11/00* (2006.01)

(52) U.S. Cl.
CPC ......... *B25J 13/006* (2013.01); *B25J 11/0075* (2013.01)

(58) Field of Classification Search
CPC ...... B25J 13/006; B25J 13/06; B25J 11/0075; B25J 9/1656; G05B 2219/36159; G05B 2219/39443; G05B 2219/45013; G05B 2219/45065; G05B 19/425
See application file for complete search history.

(56) References Cited

U.S. PATENT DOCUMENTS

| | | | |
|---|---|---|---|
| 2013/0140203 A1* | 6/2013 | Chiang | G06F 1/1628 206/320 |
| 2016/0070405 A1* | 3/2016 | Wada | G06F 1/26 345/173 |
| 2016/0379482 A1* | 12/2016 | Saito | G06F 1/26 340/12.5 |
| 2018/0136631 A1* | 5/2018 | Takahashi | B25J 9/163 |
| 2019/0126489 A1* | 5/2019 | Wada | B25J 9/163 |
| 2020/0223056 A1* | 7/2020 | Jung | B25J 9/0003 |
| 2023/0330855 A1* | 10/2023 | Asato | B05B 12/124 |

FOREIGN PATENT DOCUMENTS

KR  20170071351 A  *  6/2017

* cited by examiner

*Primary Examiner* — Khoi H Tran
*Assistant Examiner* — Nhi Q Bui
(74) *Attorney, Agent, or Firm* — John A. Miller; Shumaker, Loop & Kendrick, LLP

(57) ABSTRACT

A system and method for teaching a painting robot using wireless signals. The system includes a robot teaching assembly having a teaching tablet and a cradle to which the tablet is mounted, where the tablet includes a screen and a tablet Wi-Fi radio. The system also includes a robot controller assembly having a robot controller and a controller Wi-Fi radio, where the tablet radio and the controller radio are in wireless communication with each other to transmit signals to teach the robot. The cradle includes an emergency stop button for stopping the robot and an enable switch that must be closed to allow the robot to operate. The emergency stop button and enable switch are electrically coupled to the robot controller assembly by a safety signal cable. The cradle and the teaching tablet are not electrically coupled.

14 Claims, 1 Drawing Sheet

METHOD FOR OPERATION AND MONITORING OF PAINTING ROBOT

BACKGROUND

Field

This disclosure relates generally to a system and method for transmitting signals between a teaching tablet and a controller for teaching a robot and, more particularly, to a system and method for wirelessly transmitting signals between a teaching tablet and a controller for teaching a painting robot.

Discussion of the Related Art

Robots are known to perform a multitude of tasks including painting an object, such as a vehicle body. A typical painting station for painting, for example, the exterior surfaces of vehicle bodies in both a continuous conveyance and stop station systems includes a spray booth, a plurality of painting robots and opener/closer robots disposed on a periphery thereof. These robots can be mounted on the floor, the wall, the ceiling or side rails. The painting robots carry either spray guns or rotary applicators for directing atomized paint toward the vehicle body.

Augmented reality (AR) has been described as an interactive experience of a real-world environment where objects that reside in the real-world are enhanced by computer-generated perceptual information in the virtual world. The use of AR systems for simulating the operation of industrial robots for calibration purposes, teaching purposes, etc. is known in the art. An AR system can be used, for example, for teaching a robot how to perform a certain operation, such as painting a vehicle, welding vehicle body panels, etc., where a skilled operator uses the AR system to demonstrate the operation and the robot learns the motions involved in a manner well understood by those skilled in the art. The AR system can also be used for other teaching activities, such as establishment of virtual safety zones into which the robot must not encroach.

In one known design, an AR program or other robot teaching program is loaded onto a handheld teaching pendant tablet and the tablet is mounted in a tablet cradle having an enable switch that must be held while the robot is being taught and is moving and an emergency stop push button, which both operate as safety features. Generally, a standard teaching pendant cable connects the cradle, which is inside of the safety fence of the robot, to the robot controller, which is outside of the safety fence, where the data signals operate using the Ethernet to provide the desired data speed. The tablet cradle includes a circuit board that converts an Ethernet (TCP/IP) communications signal from the cable to a USB-C type connection for the tablet. This hardwired USB-C connection provides the data connection to the tablet that displays the robot status and provides teaching, jogging, programming and configuration setting controls of the robot.

The paint that is sprayed by a painting robot is combustible and therefore various precautions need to be taken so that the electrical signals on the cables between the tablet and the robot controller and the electrical signals on the connections between the tablet and the cradle cannot generate sparks that could ignite the paint in the atmosphere. The safety signals traveling from the enable switch and emergency stop button on the cradle to the robot controller can be provided on a safety signal cable, which prevents any possibility of generating a spark. However, the data signals that are high speed, constantly on and complex and travel over the Ethernet connection cannot use such safety cables, and thus it is very difficult, bulky and expensive to provide the level of safety required for these data signals. Further, certain ones of the known teach pendant tablets are only authorized for the painting robot environment if nothing else is plugged into it, and thus being connected to the cradle violates that protocol.

SUMMARY

The following discussion discloses and describes a system and method for teaching a painting robot using wireless signals. The system includes a robot teaching assembly having a teaching tablet and a cradle to which the tablet is mounted, where the tablet includes a screen and a tablet Wi-Fi radio. The system also includes a robot controller assembly having a robot controller and a controller Wi-Fi radio, where the tablet radio and the controller radio are in wireless communication with each other to transmit signals to teach the robot. The cradle includes an emergency stop button for stopping the robot and an enable switch that must be closed to allow the robot to operate. The emergency stop button and enable switch are electrically coupled to the robot controller assembly by a safety signal cable. The cradle and the teaching tablet are not electrically coupled.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a system and method for wirelessly transmitting signals between a teaching tablet and a controller for teaching a painting robot is merely exemplary in nature, and is in no way intended to limit the disclosure or its applications or uses.

Figure 1:
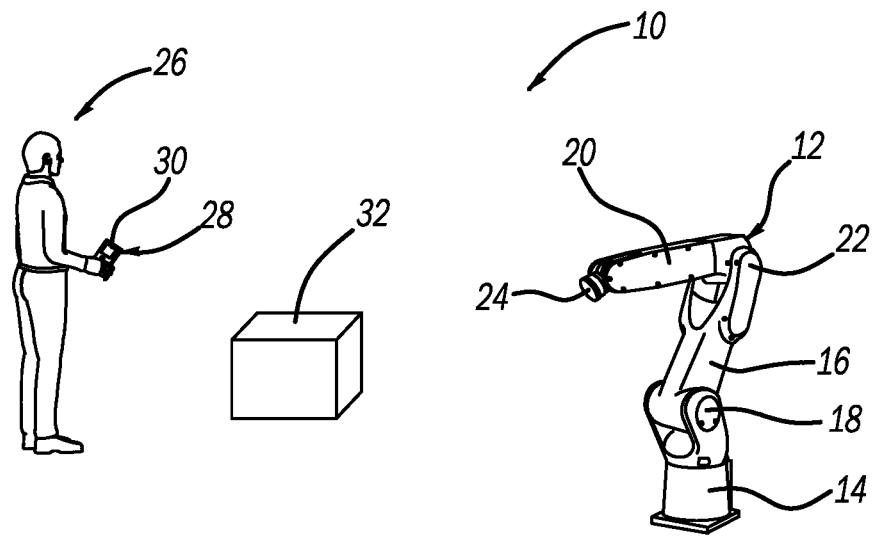
FIG. 1 is an illustration of a work station including a painting robot.

FIG. 1 is an illustration of a work station 10 including a painting robot 12 having a base portion 14, an extension link 16 coupled to the base portion 14 by a rotary and pivot joint 18, a working link 20 coupled to the extension link 16 opposite to the base portion 14 by an elbow pivot joint 22 and an end-effector 24, specifically a paint nozzle. The robot 12 can be any multi-axis industrial robot suitable for the purposes discussed herein, such as a six-axis robot, that can be programmed to perform a variety of painting operations. A user 26 is shown standing in the work station 10 and holding a teaching pendant tablet 28, such as the IS930.1 tablet, on which has been downloaded a robot teach application. The tablet 28 includes a screen 30 for displaying robot motion and commands for teaching the robot 12 in a manner well that is understood by those skilled in the art. As will be discussed in detail below, the tablet 28 is in communication with a robot controller provided in an auxiliary control panel (ACP) 32 using any suitable Wi-Fi protocol, where the tablet 28 is inside of the safety fence (not shown) of the work station 10 and the ACP 32 is outside of the safety fence of the work station 10.

Figure 2:
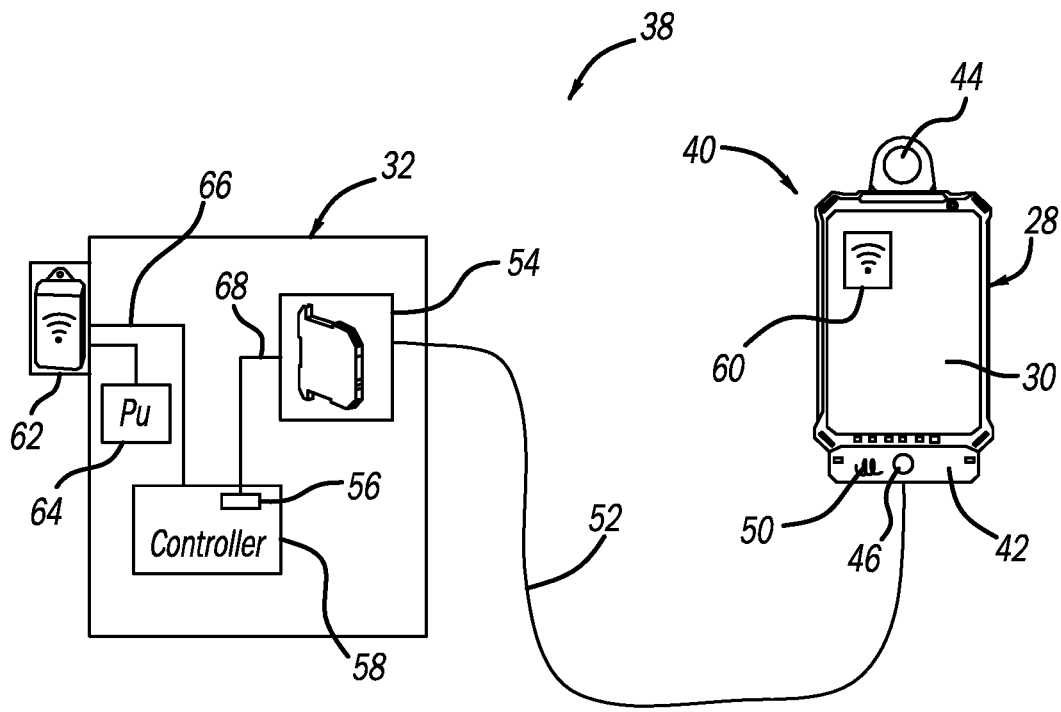
FIG. 2 is an illustration of a robot teach system associated with the work station shown in FIG. 1.

FIG. 2 is an illustration of a robot teach system 38 including a tablet assembly 40 having the teaching tablet 28 and a cradle 42 in which the tablet 28 is mounted, and the ACP 32. The cradle 42 includes an emergency stop push button 44 and an enable switch 46 that must be held while the robot 12 is being taught and is moving, which operate as safety features. The traditional circuit board that converts the Ethernet (TCP/IP) communications signal to a USB-C type connection is removed from the cradle 42 and is replaced with a wiring harness 50 connected to the stop button 44 and the enable switch 46 so that the tablet 28 is not electrically coupled to the cradle 42. The system 38 includes a safety signal cable 52 that is electrically coupled to the wire harness 50 and a power barrier device 54 in the ACP 32 that limits the energy if there is a fault on the cable 52. The safety signals that are sent through the device 54 are routed on line 68 to an emergency stop circuit board 56 in a robot controller 58 in the ACP 32.

The tablet 28 has a built in radio 60 for wireless communications purposes over a Wi-Fi protocol. The system 38 also includes a radio 62 shown here mounted to or in the ACP 32, although the radio 62 can be separated from the ACP 32 and be wirelessly connected to it using a suitable antenna. The radio 62 is powered by a power unit 64 in the ACP 32 and is in electrical communication with the controller 58 on line 66. Therefore, the Ethernet communications signals are wirelessly transmitted between the tablet 28 and the controller 58 for teaching the robot 12, which removes the electrical connection that could otherwise generate a spark, and the safety signals are reliably hardwired between the tablet 28 and the controller 58.

This system 38 also accommodates the application for when using the tablet 28 to "echo" the screen of another teaching pendant device. Specifically, the same method of connecting a tablet computing device to a paint robot controller by Wi-Fi connection for data communications can also be used to "echo" the screen of another teaching pendant device. The "echo" function can be used to display whatever is being transmitted to one teaching pendant device to a second device using Wi-Fi. In the case of the "echo" mode the tablet 28 does not provide any control functions and only displays the same HMI screen output as the one teaching pendant device.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A robot teaching system comprising:
a robot teaching assembly including a teaching tablet and a cradle to which the tablet is mounted, said tablet including a screen and a tablet Wi-Fi radio; and
a robot controller assembly including a robot controller and a controller Wi-Fi radio, said tablet radio and said controller radio being in wireless communication with each other to transmit signals to teach a robot, wherein the tablet and the cradle are not electrically coupled together, and wherein the cradle includes an emergency stop button for stopping the robot and an enable switch that must be closed to allow the robot to operate, said emergency stop button and enable switch being electrically coupled to the robot controller assembly by a safety signal cable.

2. The system according to claim 1 wherein the robot is a painting robot.

3. The system according to claim 1 wherein the robot controller assembly includes a power barrier that limits the power on the safety signal cable.

4. The system according to claim 1 wherein the robot controller assembly is an auxiliary control panel (ACP), said controller radio being mounted to or in the ACP.

5. The system according to claim 1 wherein the robot controller assembly is an auxiliary control panel (ACP), said controller radio being separated from the ACP.

6. A robot teaching system for teaching a painting robot, said system comprising:
a robot teaching assembly including a teaching tablet and a cradle to which the tablet is mounted, said tablet including a screen and a tablet Wi-Fi radio, said cradle including an emergency stop button for stopping the robot and an enable switch that must be closed to allow the painting robot to operate, wherein the tablet and the cradle are not electrically coupled together; and
a robot controller assembly including a robot controller and a controller Wi-Fi radio, said tablet radio and said controller radio being in wireless communication with each other to transmit signals to teach the painting robot, said emergency stop button and enable switch being electrically coupled to the robot controller assembly by a safety signal cable.

7. The system according to claim 6 wherein the robot controller assembly includes a power barrier that limits the power on the safety signal cable.

8. The system according to claim 6 wherein the robot controller assembly is an auxiliary control panel (ACP), said controller radio being mounted to or in the ACP.

9. The system according to claim 6 wherein the robot controller assembly is an auxiliary control panel (ACP), said controller radio being separated from the ACP.

10. A method for teaching a robot, said method comprising:
mounting a teaching tablet to a cradle, said tablet including a screen and a tablet Wi-Fi radio;
providing a controller Wi-Fi radio associated with a robot controller assembly; and
wirelessly transmitting signals between the tablet radio and the controller radio to teach the robot, wherein the tablet and the cradle are not electrically coupled together, and wherein the cradle includes an emergency stop button for stopping the robot and an enable switch that must be closed to allow the robot to operate, said emergency stop button and enable switch being electrically coupled to the robot controller assembly by a safety signal cable.

11. The method according to claim 10 wherein the robot is a painting robot.

12. The method according to claim 10 wherein the robot controller assembly includes a power barrier that limits the power on the safety signal cable.

13. The method according to claim 10 wherein the robot controller assembly is an auxiliary control panel (ACP), said controller radio being mounted to or in the ACP.

14. The method according to claim 10 wherein the robot controller assembly is an auxiliary control panel (ACP), said controller radio being separated from the ACP.

* * * * *